२,७४४,०५०

PROCESSES FOR INCREASING THE YIELD OF ENZYMES

Elmer A. Weaver, Fort Washington, Pa., assignor to the United States of America as represented by the Secretary of Agriculture No Drawing. Application January 23, 1952,
Serial No. 267,907

6 Claims. (Cl. 195—66)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to useful microbial products such as enzymes like maltase and a-amylase, vitamins like vitamin $B_{12}$ and riboflavin, and antibiotics like subtilin, and has as its prime object the provision of processes for increasing the yields of such products. Other objects will be apparent from the description of the invention.

In general, according to the invention, microorganisms, particularly those which produce the useful microbial products mentioned above, such as the genus Aspergillus and preferably the species *Aspergillus niger* and *Aspergillus oryzae* which produce maltase and a-amylase, *Bacillus megatherium* which produces vitamin $B_{12}$, *Ashbya gossypii* which produces riboflavin, and *Bacillus subtilis* which produces subtilin, are cultured in a conventional manner and the resulting cells killed by application of a lethal chemical such as ammonium bifluoride, merthiolate (sodium ethyl mercurithiosalicylate), or the sodium salt of 2,4,6-trichlorophenol. The dead microorganisms are then aged for several days or weeks, usually for a period of from one to thirty days, at or above ordinary room temperature, preferably from 20° C. to 40° C. and the resulting desired product can thereafter be separated as by conventional extraction with an aqueous or organic solvent. The product is thus more readily isolated and in greater yield than in conventional processes.

The invention further provides a process which improves on that described above. In this process, the microorganisms are cultured and killed by the lethal chemical, as described above, and the dead cells comminuted, with or without intervening aging. The desired microbial product is then isolated, as by extraction in the manner shown above, to obtain a yield greatly exceeding that obtained obtained in the foregoing described process.

When microorganisms are killed by application of the lethal chemical, progressive changes occur in the cell whereby the desired cellular constituent (enzyme, vitamin, antibiotic, etc.) may be more readily separated and obtained in greater yield than in conventional processes. Since these changes are progressive, aging or storage of the killed microorganisms for several days or weeks, preferably at or above ordinary room temperature, increases the yield of the desired product. Storage at temperatures above 10° C. would require great care to prevent microbial contamination in the absence of a lethal chemical. However, in the presence of the lethal chemical added in the inventive process such contamination is impossible and aging is simplified. The lethal chemical used must be chosen so that it effectively kills the microorganisms cultured and also prevents accidental contamination with extraneous organisms, yet it must not destroy or inactivate the microbial product sought. The chemical will generally be selected from the known bactericides and fungicides and is employed in a lethal concentration. For example, in using ammonium bifluoride, a concentration of 0.01% to 0.1% is effective.

To minimize the expense of handling, treating and aging or storing large volumes of culture medium containing the microorganisms, it is often advantageous to concentrate the cells by filtration, decantation, centrifugation, or other known means, either before or after treatment with the lethal chemical.

The aging of the dead cells, before or after comminution, is highly beneficial and usually should be done at the highest temperature that will not destroy or inactivate the desired product. During this aging period, changes occur which facilitate extraction of the product and increase the yield obtained. The period of aging will vary widely depending on the particular microorganism used, the product to be recovered, and the temperature of aging, and will usually range from one to thirty days. The increase in yield due to aging is usually large at first and then becomes progressively less as the time is increased until finally a point is reached beyond which further storage is not justified by the small increment to be obtained thereby.

Comminution of the microbial cells may be achieved by any convenient process which will rupture a significant proportion of the cells without destroying or inactivating the product sought, such as by maceration, grinding, pulverizing, triturating, or the like. This rupture of the cell walls liberates the contents of the cell and thus facilitates extraction of the desired cellular components. Also, even those cells which are not ruptured are separated one from another and from inanimate particles in the medium so that the extracting solvent subsequently used has more ready access to the cells thereby accelerating the process of extraction. Known means of comminution include grinding the cells with sand with a mortar and pestle, grinding in a ball mill, and passage through a Logeman hand homogenizer, Charlotte colloid mill, or a Potter mill (Potter and Elvehjem, Jour. Biol. Chem. 114, 495 (1936)). The preferred method consists of repeated processing in the microbial comminutor described and claimed in my copending application entitled "Improved Microbe Comminutor," filed January 23, 1952, Serial No. 268,898, now abandoned. Excessive heat in grinding should be avoided since it might inactivate an enzyme or an antibiotic, or chemically alter a vitamin.

The following examples are illustrative of the invention. Examples I through VII, inclusive, describe the process wherein comminution of the dead cells is not employed. Examples VIII to XII, inclusive, describe that feature of the invention utilizing comminution of the dead cells.

EXAMPLE I

*Aspergillus niger* was grown on a medium of 6 percent whole potato solids in an aerated fermenter. After production of an abundant crop of fungus cells, the contents of the fermenter were divided into two equal parts. No treatment was given to one part which was to serve as a control. To the other was added 0.1 percent of ammonium bifluoride, whereby the cells were killed. Both portions were then aged 3 days at 30° C., after which the maltase potencies were determined and the results expressed as maltase units, this being the number of milligrams of maltase hydrolyzed per ml. of culture per hour. The results were: Control, 5.8 units, treated portion, 7.3 units, an increase of 26 percent. After an additional 15 days storage at 30° C., the treated portion showed a potency of 10.3 units, an increase of 78 percent over the control.

EXAMPLE II

*Aspergillus niger* was grown and divided as in Example I. To the test portion, instead of the ammonium bifluoride used in Example I, 0.1 percent of merthiolate (sodium ethyl mercurithiosalicylate) was added. The control portion was divided and one portion was aged at 4° C. to prevent further growth. The other portion and the test portion containing the skilled cells were aged at 30° C. After 18 hours the latter two portions showed maltase potencies of 18.1 and 17.3 units, respectively, showing that the merthiolate had destroyed 4 percent of the available maltase. However, after 14 days the control stored at 4° C. showed a potency of only 18.5 units, while the test portion stored at 30° showed 23.9 units, or an increase of 29 percent due to the use of the lethal agent. This showed that while merthiolate destroyed some maltase, it increased the amount available from the dead cells after 14 days at 30° C. by an amount greater than it destroyed.

EXAMPLE III

*Aspergillus niger* was grown and divided as in Example I. Instead of the ammonium bifluoride used in Example I, 0.1 percent of the sodium salt of 2,4,6-trichlorophenol was added to the test portion. After storage for two days the control, stored at 4° C., showed a maltase potency of 7 units, while the test portion, stored at 30° C., showed 9 units, an increase of 29 percent.

EXAMPLE IV

*Aspergillus oryzae* was grown on a medium of 5 percent whole potato solids in an aerated fermenter. After production of an abundant crop of fungus cells the contents of the fermenter was divided into two parts. One portion was kept as a control, while to the other was added 0.01 percent of the sodium salt of 2,4,6-trichlorophenol. After storage of 7 days, the control at 4° C. and the test portion at 30° C., the total starch-converting enzymes present were determined by the method of Erb, Wisthoff and Jacobs, Jour. Bact., 55, 813–821 (1948). The control showed 11.8 units; the test portion 14.1 units, an increase of 20 percent.

EXAMPLE V

*Aspergillus oryzae* was grown and divided as in Example IV. The cells in the test portion were killed by the addition of 0.01 percent sodium salt of 2,4,6-trichlorophenol. After storage for 6 days the samples were analyzed for a-amylase by the method of Sandstedt, Kneen and Blish, Cereal Chemistry, 16, 712–723 (1939). The control, stored at 4° C., showed 12.0 units, and the test portion, stored at 30° C., showed 13.3 units, an increase of 11 percent.

EXAMPLE VI

*Aspergillus oryzae* was grown, divided, and the test portion treated with a lethal chemical as in Example V. The control was aged 5 days at 4° C., and the test portion was aged 5 days at 30° C. Total starch-converting enzymes were then determined as in Example IV. The control showed 23.1 units, while the treated portion showed 32.2 units, an increase of 39 percent.

EXAMPLE VII

*Aspergillus oryzae* was grown, divided, and the test portion treated as in Example IV. The portions were then stored 18 days, the control at 4° C. and the test portion at 30° C. Total starch-converting enzymes were then determined as in Example IV. The control showed 43.0 units, while the test portion showed 50.8 units, an increase of 14 percent.

In the following Examples VIII through XI *Aspergillus niger* was grown on a 6 percent potato solids medium until an abundant growth of cells was obtained. The maltase produced by the cells was then determined as available maltase by a conventional analytical procedure. The effects of killing and storing the cells and of comminution of the dead cells before analysis were determined for different lethal agents and different periods of storage and are summarized in the following table. The maltase values are expressed as mg. of maltose hydrolyzed per ml. of culture per hour. Comminuation was achieved by passing the culture five times through my improved hand homogenizer. The procedures and results obtained in Examples VIII through XI are shown below in tabulated form.

*Effect of chemical and mechanical treatment of Aspergillus niger mycelium on liberation of soluble maltase*

| Example | Lethal Chemical | Aging | | Maltase Values, Comminution | |
| --- | --- | --- | --- | --- | --- |
| | | Time | Temp., °C. | Yes | No |
| VIII | None (Control) | 18 hours | 30 | | 18.1 |
| | 0.1% merthiolate | 18 hours | 30 | | 17.3 |
| IX | None (Control) | 14 days | 4 | 22.5 | 18.5 |
| | 0.1% merthiolate | 14 days | 30 | 27.1 | 23.9 |
| X | None (Control) | 3 days | 30 | 8.9 | 5.8 |
| | 0.1% ammonium bifluoride | 3 days | 30 | 17.3 | 7.3 |
| XI | 0.1% ammonium bifluoride | 18 days | 30 | 20.4 | 10.3 |

EXAMPLE XII

*Aspergillus niger* was grown as in Examples VIII–XI. The fungus in one portion of the culture was killed by addition of 0.01 per cent of sodium 2,4,5-trichlorophenolate. After storage for 24 hours at 30° C., starch-converting enzymes were determined by the method of Erb, Wisthoff and Jacobs, Jour. Bact., 55, 813–821 (1948). The control and the portion treated with the fungicide showed 12.9 and 15.0 per cent starch conversion, respectively. Comminuted samples showed 16.4 and 18.4 per cent, respectively.

Although the above examples indicate the use of species of Aspergillus to produce starch-converting enzymes or maltase, the process is likewise applicable to the production of vitamin $B_{12}$ by *Bacillus megatherium*, riboflavin by *Ashbya gossypii*, and subtilin by *Bacillus subtilis*.

It has long been known that comminution of living cells increases the recovery of enzymes, and I have shown above that killing and then aging or storing the dead cells also increases the recovery of the microbial products. It might have been expected that comminution was simply a way of doing quickly what was done more slowly by killing and aging the cells and that, therefore, no additional yield of product was to be expected by comminution of cells already killed and aged. The examples above, however show that comminution increases the yield over and above that otherwise obtainable from the killed and aged cells. In fact, the increase in yield by comminution is frequently greater from killed and aged cells than from living cells.

What is claimed is:

1. A process for increasing the yield of a starch-converting enzyme selected from the group consisting of maltase and a-amylase, comprising culturing an Aspergillus fungus selected from the group consisting of *Aspergillus niger* and *Aspergillus oryzae*, respectively, killing the resulting cells by application to the resulting culture of a lethal chemical which kills the microorganisms cultured, prevents contamination with extraneous organisms, and does not inactivate the said enzyme being sought, said lethal chemical being selected from the group consisting of ammonium bifluoride, sodium ethyl mercurithiosalicylate, and the sodium salt of 2,4,6-trichlorophenol, aging the culture containing the dead cells for a period of about from one to thirty days, comminuting the aged culture containing the aged, dead cells, and separating maltase and a-amylase, respectively, as the starch-converting enzyme from the comminuted, aged culture.

2. The process of claim 1 wherein the Aspergillus fungus is *Aspergillus niger* and the enzyme is a maltase.

3. The process of claim 1 wherein the Aspergillus fungus is *Aspergillus oryzae* and the enzyme is a-amylase.

4. The process of claim 1 wherein the lethal agent is ammonium bifluoride.

5. The process of claim 1 wherein the lethal agent is sodium ethyl mercurithiosalicylate.

6. The process of claim 1 wherein the lethal agent is the sodium salt of 2,4,6-trichlorophenol.

References Cited in the file of this patent

UNITED STATES PATENTS

| | | |
|---|---|---|
| 1,263,817 | Takamine | Apr. 23, 1918 |
| 1,611,700 | Waksman | Dec. 21, 1926 |
| 1,820,957 | Wallerstein | Sept 1, 1931 |
| 1,990,505 | Wallerstein | Feb. 12, 1935 |
| 2,149,306 | Millar | Mar. 7, 1939 |
| 2,184,748 | Light et al. | Dec. 26, 1939 |

OTHER REFERENCES

Erb et al.: Journal of Bacteriology, vol. 55, No. 6, June 1948, pages 817 to 821.

Waksman et al.: "Enzymes," 1926, pages 128 to 130.